US006683619B1

United States Patent
Samra

(10) Patent No.: US 6,683,619 B1
(45) Date of Patent: Jan. 27, 2004

(54) SYSTEM AND METHOD FOR INCREASING PERFORMANCE WHEN COMPOSITING IMAGES

(75) Inventor: Sukendeep Samra, Venice, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 314 days.

(21) Appl. No.: 09/691,795

(22) Filed: Oct. 18, 2000

(51) Int. Cl.[7] .................................................. G09G 5/00
(52) U.S. Cl. ........................ 345/619; 345/628; 345/440; 345/763; 345/501; 700/83; 700/87; 715/500.1; 715/500
(58) Field of Search ................................ 345/619, 628, 345/440, 441, 763, 839, 853, 789, 501, 522; 385/155; 700/83, 87; 715/500.1, 500

(56) References Cited

U.S. PATENT DOCUMENTS

| | | | | | |
|---|---|---|---|---|---|
| 4,953,106 A | * | 8/1990 | Gansner et al. | ............. | 345/440 |
| 5,490,246 A | * | 2/1996 | Brotsky et al. | ............. | 345/763 |
| 6,266,053 B1 | * | 7/2001 | French et al. | ................ | 345/302 |
| 2003/0001844 A1 | * | 1/2003 | Driemeyer et al. | ......... | 345/426 |

OTHER PUBLICATIONS

Nadas et al., Jul. 1997, ACM, Computer Graphics, vol. 21, No. 4 pp. 75–84.*

* cited by examiner

*Primary Examiner*—Matthew Luu
*Assistant Examiner*—Faranak Fouladi
(74) *Attorney, Agent, or Firm*—Blakely, Sokoloff, Taylor & Zafman LLP

(57) ABSTRACT

A system and method for increasing the performance of a compositing system when compositing images represented as a directed acyclic graph. The method comprises identifying at least one critical path, determining a set of input nodes to each critical path, and caching the images at each of the input nodes to each critical path. The critical paths may comprise all nodes between and including the edit nodes on one end and the view node at another end. The method may also include receiving a user designation of at least one view node and at least one edit node, receiving a request to view the video presentation at a view node, processing data at the view node responsive to the request, and displaying the video presentation at the view node. Caching may be implemented when processing nodes such that when processing a node, a determination is made whether the node is an input node to one of the critical paths. If a node is an input node to one of the critical paths, the cache memory is checked to determine if the node is already cached. If the node is cached, the node is retrieved from cache memory; if the node is not in the cache, the node is processed and the resulting data is cached.

26 Claims, 3 Drawing Sheets

SYSTEM AND METHOD FOR INCREASING PERFORMANCE WHEN COMPOSITING IMAGES

BACKGROUND OF THE INVENTION

1. Field of the Invention

The present invention relates to the field of computer graphics, compositing images, adding special effects to images, and increasing the performance thereof.

2. Background

Compositing images is the combining of more than one image to create a single new image. Compositing of images can be performed with a single image frame, such as a photograph or a sequence of images, such as film or movies. For example an image of a fish could be combined with the image of a grassy field so that the fish is swimming in the grass. Alternatively, two (or more) sequences of images can be composited. For example, a sequence of images of a wind blown grassy field and a sequence of images of a school of fish swimming through the ocean may be composited to form a sequence of images showing the school of fish swimming through the grassy field. The school of fish and/or the grassy field may be created in an animation program or be a film of real world events.

Compositing also includes the techniques of enhancing a sequence of images captured on film by adding special effects, computer generated images, still images, animation, and other filmed images to a motion picture. Compositing is used to alter a sequence of film, thus creating a new sequence of images. Special effects, computer generated images, still images, animation and other filmed images are combined with film by compositing to create a new, altered sequence of images.

To create an end result image or sequence of images, input images from various sources are combined with various effects. Effects may also be referred to as operators. Examples of effects include hue, color correction, zoom, composite, translate, rotate, scale, and shear.

SUMMARY

The present invention provides a system and method for increasing the performance of a compositing system when compositing images represented as a directed acyclic graph. The method comprises identifying at least one critical path, determining a set of input nodes to each critical path, and caching the images at each of the input nodes to each critical path. The critical paths may comprise all nodes between and including the edit nodes on one end and the view node at another end. The method may also include receiving a user designation of at least one view node and at least one edit node, receiving a request to view the video presentation at a view node, processing image data at the view node responsive to the request, and displaying the video presentation at the view node. Caching may be implemented when processing nodes such that when processing a node, a determination is made whether the node is an input node to one of the critical paths. If a node is an input node to one of the critical paths, the cache memory is checked to determine if the node is already cached. If the node is cached, the node is retrieved from cache memory; if the node is not in the cache, the node is processed and the resulting image is cached.

BRIEF DESCRIPTION OF THE DRAWINGS

The features and advantages of the present invention will become apparent from the following detailed description of the present invention in which.

DETAILED DESCRIPTION

When creating a movie, sequences of images are traditionally shot with a camera, developed and edited to create a finished product. Special effects have been added to films in many ways. More recently, with the availability of high powered computers, computer software programs are increasingly used to assist in the creation of movies, television shows, and other video presentations whether originating from animation or live action camera shots. To clarify various qualities of the present invention, the phrase video presentation includes sequences of images such as film, movies, animation, features, shorts, and the like created by digital film or video footage, digitized film or video input, computer generated images, hand drawn images, still images such as photographs and the compositing of each of these including the adding of effects. In addition, the phrase sequence of images includes any sequence of images created by filming, videotaping, still photography, computer generated images such as animation, hand drawn images such as animation, and the like.

In one embodiment, the image data that is used to represent the video presentations and sequences of images may include two-dimensional and three-dimensional geometry data such as mesh, bicubic patches, particle effect data, and any other method that defines a set of points and a rotation of how the points are joined or assembled to form a surface. This geometry data may include representations of basic geometric shapes such as spheres, rectangles, pyramids, cones, etc. The image data may also include color data and texture data for each point of geometry data. Further, in one embodiment, a video presentation or sequence of images may be accompanied by audio data including a soundtrack comprising sound effects, voice, music, etc. The audio data may include sound data or music data comprising a soundtrack and may be in any format such as, for example, the audio interchange file format (AIFF) and wave format (WAV). In this embodiment, effects that apply to audio data may be added to the palette of video effects. Such audio effects may include, for example, volume, left to right, right to left, center, equalize, dampen, fade in, fade out, etc. In addition, in some embodiments, the video effects may also include audio related properties.

Computer programs used in manipulating sequences of images for producing video presentations are compositing programs commonly referred to as effects software or digital effects software. Examples of such programs include Media Illusion® available from the Softimage™ division of Avid Technology, Inc., One Park West, Tewksbury, Mass. 01876; Chalice, available from Silicon Grail Corporation, 710 Seward Street, Hollywood, Calif. 90038, and the Maya and Studio series of programs, available from Alias Wavefront®, 210 King Street East, Toronto, Ontario, Canada M5A 1J7.

Figure 1:
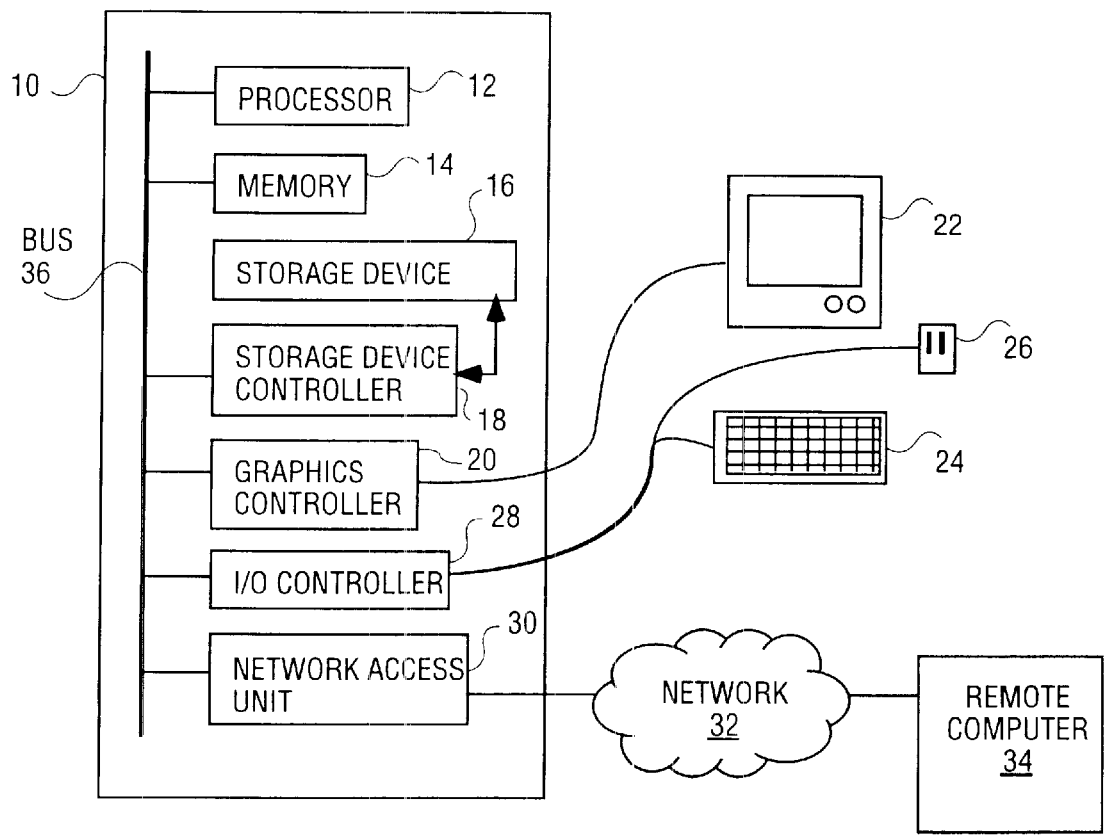
FIG. 1 depicts one embodiment of a system and environment in which the method of the present invention is executed.

FIG. 1 depicts one embodiment of a system and environment in which the method of the present invention is executed. A compositing program is executed on computer 10. The computer comprises a processor 12 to execute the compositing program. Processor 12 may be any computer processor known to those skilled in the art. When executing the compositing program, the processor utilizes memory 14. Memory 14 may be of any form including a volatile random access memory (RAM). Thus, in one embodiment, instructions are accessed from a media, for example RAM, and are executed by the processor to perform the methods described herein.

The compositing program accesses sequences of images from storage device 16 via storage device controller 18. The storage device 16 may be any device for reading a machine readable medium. Storage device 16 may be a writeable disk drive such as, for example, a hard disk, a floppy disk, a readable and writeable compact disk (CDRW), etc. Storage device 16 may also be a tape device such as a digital audio tape reader/writer, or a Memory Stick® storage device.

When the compositing program reads an image or sequence of images from the storage device, the processor may communicate instructions to graphics controller 20 to display the images on display device 22. Graphics controller 20 may be any graphics controller known to those skilled in the art, and display device 22 may be any display monitor known to those skilled in the art, including, but not limited to, a cathode ray tube (CRT) display monitor, or thin film transistor (TFT) display screen. A user accesses the compositing program running on computer 10 via any computer input device known to those skilled in the art, such as, for example, keyboard 24 and mouse 26 which are coupled to the processor by input/output (I/O) controller 28. Computer 10 may be any kind of computing device known to those skilled in the art, including, but not limited to, personal computers, specialty graphics workstations, etc.

In one embodiment, to access images not stored on computer 10, computer 10 includes a network access unit 30 which allows the compositing program to communicate over network 32 to remote computer 34 and access images stored on remote computer 34. Network 32 may be a local area network (LAN), wide area network (WAN), or any other kind of network known to those skilled in the art. Remote computer 34 may be any kind of computing device known to those skilled in the art, including, but not limited to, personal computers, specialty graphics workstations, and servers. Remote computer 34 includes at least one storage device (not shown) such as, for example, a hard disk drive, a readable compact disk (CDR), and a disk array. Although only one remote computer and one network are depicted, multiple remote computers over multiple networks may be connected to computer 10. Processor 12, memory 14, storage device controller 18, graphics controller 20, I/O controller 28 and network access unit 30, are coupled to one another via and communicate with one another over bus 36. Bus 36 may be any bus known to those skilled in the art. Although only one bus is depicted, multiple buses may be used in computer 10. In addition, other internal components known to those skilled in the art (not depicted) or multiple instances of depicted components may be included in computer 10.

Figure 2:
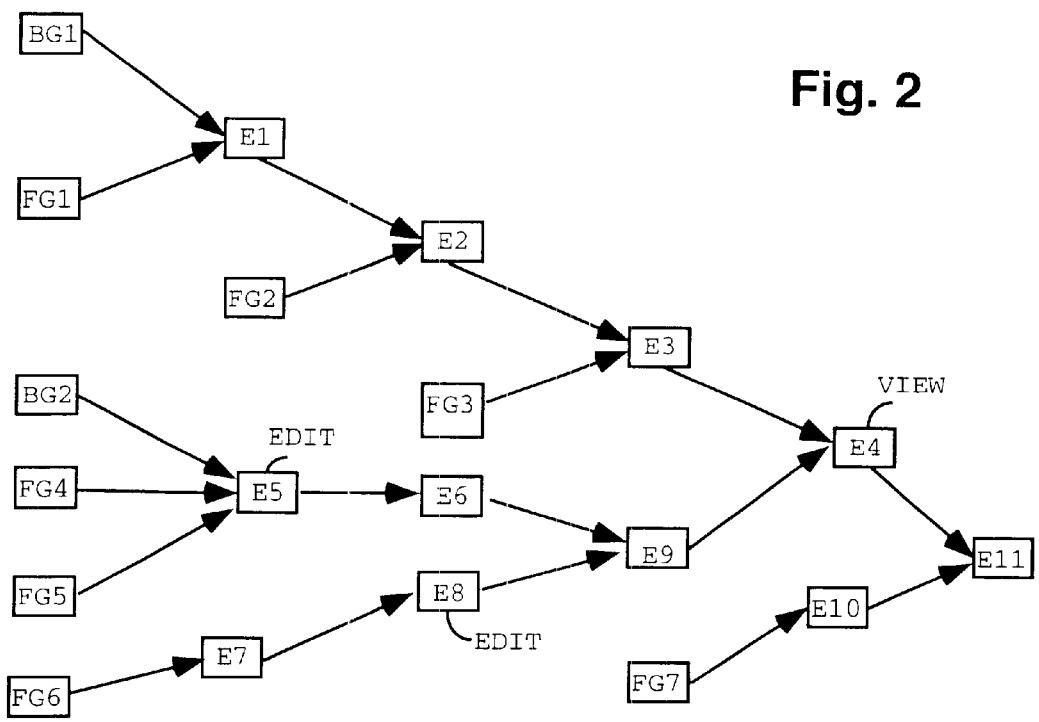
FIG. 2 depicts an example of a compositing tree comprised of effects and images.

FIG. 2 depicts one embodiment of a compositing tree comprised of effects and images. A compositing tree is a directed acyclic graph that results when a user of a compositing program selects images and effects to create a final resulting image. When using compositing programs, a user manually designates images, sequences of images, and effects that will be combined to form a resulting video presentation. The compositing tree reflects the selections made by the user and may be depicted in various ways. Each rectangle in FIG. 2 is a node. Each node represents an effect. Even though effects are more commonly thought of as operations that alter an image, obtaining an image or sequence of images from a local or remote disk (or other media) may be considered an effect with no input, or a node with no input. In one embodiment, the user may designate a soundtrack comprised of audio data to accompany the sequence of images and the video presentation.

To begin the process of creating a composited sequence of images, many users first designate a background image such as background image BG1. The user may then choose an effect such as effect E1 to apply to background image BG1. Both foreground image FG1 and background image BG1 are inputs to effect E1. This sequence may be used to combine image FG1 with image BG1 such that E1 is a simple composite effect that combines foreground image FG1 and background image BG1. The user may then combine the composite of BG1 and FG1 with another foreground image FG2 via effect E2, another simple composite operator.

Using the example discussed earlier, BG1 may be a grassy field, and FG1 and FG2 may be different images of fish. In this example, the branch including effects E1, E2 and E3 may be thought of as combining multiple fish with background image BG1. As such, foreground images FG1, FG2 and FG3 are combined via effects E1, E2, and E3, simple composite operators, to add three fish to the grassy field, BG1. Foreground images FG1, FG2, and FG3 may be four different fish, or may be the same image, or may be four different sequences of images. In addition, each of FG1, FG2, FG3 and FG7 may be filmed images, photographed images, computer generated images, animation, or any other kind of image or sequence of images.

The compositing tree may also include a larger branch such as that shown connecting to effect E4. In this example, the branch of the compositing tree leading to effect E4 may be used to add a human diver and a submarine to the fish swimming in the grassy field. As such, background image BG2 may be a submarine, foreground image FG4 may be an image depicting the name and allegiance of the submarine, and foreground image FG5 may be the human diver. Images BG2, FG4 and FG5 may be combined by composite effect E5. Further, effect E6 may be applied to the diver in front of the labeled submarine resulting from effect E5. Effect E6 may be any effect available via the compositing system, such as, for example, a hue adjustment or a framing adjustment. A graphic artist or effects specialist may use effect E6 for any number of purposes, such as to melt or soften the edges of the diver and the submarine so that they blend better into the remainder of the full image. A second diver may be added via foreground image FG6 which may have color correction effect E7 and hue adjustment effect E8, these effects being applied to image FG6 before image FG6 is combined with the first diver in front of the labeled submarine by simple composite effect E9. Composite effect E9 produces two divers with a labeled submarine. The two divers with the labeled submarine may be combined with the fish in the grassy field produced by effect E3. This is achieved via composite effect E4. A fourth fish, foreground image FG7, may be modified by effect E10 and then may be added via composite effect E11. The end result of this compositing tree may be, according to this example, four fish, a labeled submarine and two divers in a grassy field. Although not used in this example, any of the images may be geometry data defining a two-dimensional or a three-dimensional shape. If geometry data is used, the effects must be of the kind that accept geometry data. In addition, although not used in this example, any of the images may be replaced by or augmented by audio data so that a sound track and/or sound effects may be added to the video presentation. The use of audio data implies that the effects are capable of processing audio data, including sound data and/or music data.

In one embodiment, to process a current image at a selected node, the compositing program evaluates all of the nodes and processes all of the effects in the branches before the selected node. There are various methods used to process a compositing tree. Image processing such as this typically requires a significant amount of memory. The memory needed typically exceeds available RAM, and as such, techniques such as disk swapping must be utilized, resulting in time consuming transfer of image data between RAM and disk. Thus, image caching and memory management are important to all compositing systems.

When working with a compositing tree such as that in FIG. 2, it is a common practice for the user of the compositing system to regularly check on the state of the images at certain points in the compositing sequence. In practice, users often view and edit two to four nodes or locations in the compositing tree in a cyclical or repetitive manner. The reasons for such cyclical and repetitive viewing are that a user will sample the results at a particular node, decide that a certain adjustment must be made, make the adjustment, view at the particular node again, and so on, until a satisfactory result is achieved. For example, referring to the example discussed above with regard to FIG. 2, the user may repetitively view the video presentation at node E4, edit effect E5, view at node E4, edit effect E8, view node E4, and then repeatedly edit effects E5 and E8 and view the video presentation at E4. In this example, in practice, the user may be concerned with how well the grassy field with three fish resulting from effect E3 is compositing with the labeled submarine with two divers resulting from effect E9 at effect E4.

Current compositing programs do not take advantage of the repetitive and cyclical nature of users' viewing and editing habits. As a result, currently available compositing programs are slow and inefficient. To view a current video presentation such as the video presentation at node E4 of FIG. 2, a traditional compositing program may proceed backward from the selected node in a fixed, defined manner. In one traditional method, the traditional system may look for predecessor nodes with only children as input nodes, and process that node first. Such a method results in the method obtaining images and applying effects in sequence from the leaf images to the requested image. If a user proceeds in an often encountered view and edit cycle when creating a sequence of images like that in FIG. 2, this traditional system will repeatedly process the branch from images BG1 and FG1 through effect E3, and then process the branch from images BG2, FG4, FG5 and FG6 through effect E9 to view the current image resulting from effect E4. In a traditional system, each time effect E8 is edited, the system re-applies effect E7 to foreground image FG6, reloads images BG2 and FG4, processes effects E5 and E6, processes effect E9, and reprocesses from images BG1 and FG1 through effect E3 before processing the image at effect E4.

On the system and method of the present invention, it is desirable to take advantage of the cyclical nature of video compositing editing and creation and eliminate unnecessary repetitive processing performed by present compositing systems. To take advantage of compositing program users' repetitive steps, a compositing program may, in one embodiment of the present invention, allow the user to select view nodes and edit nodes. In one embodiment, the user may select one view node and multiple edit nodes. In such an embodiment, the nodes from and including an edit node to, and including, the view node are referred to as a critical path. In another embodiment, the user may select multiple view nodes such that the critical path starts with an edit node, may include view and edit nodes, and ends at a view node. All inputs to the critical path are cached. For example, a user may select effect E5 and effect E8 as edit nodes and effect E4 as a view node. If so, then the critical paths include the path from effect E5 to effect E4, including effects E6 and E9, and the path from effect E8 to effect E4 including effect E9.

Figure 3:
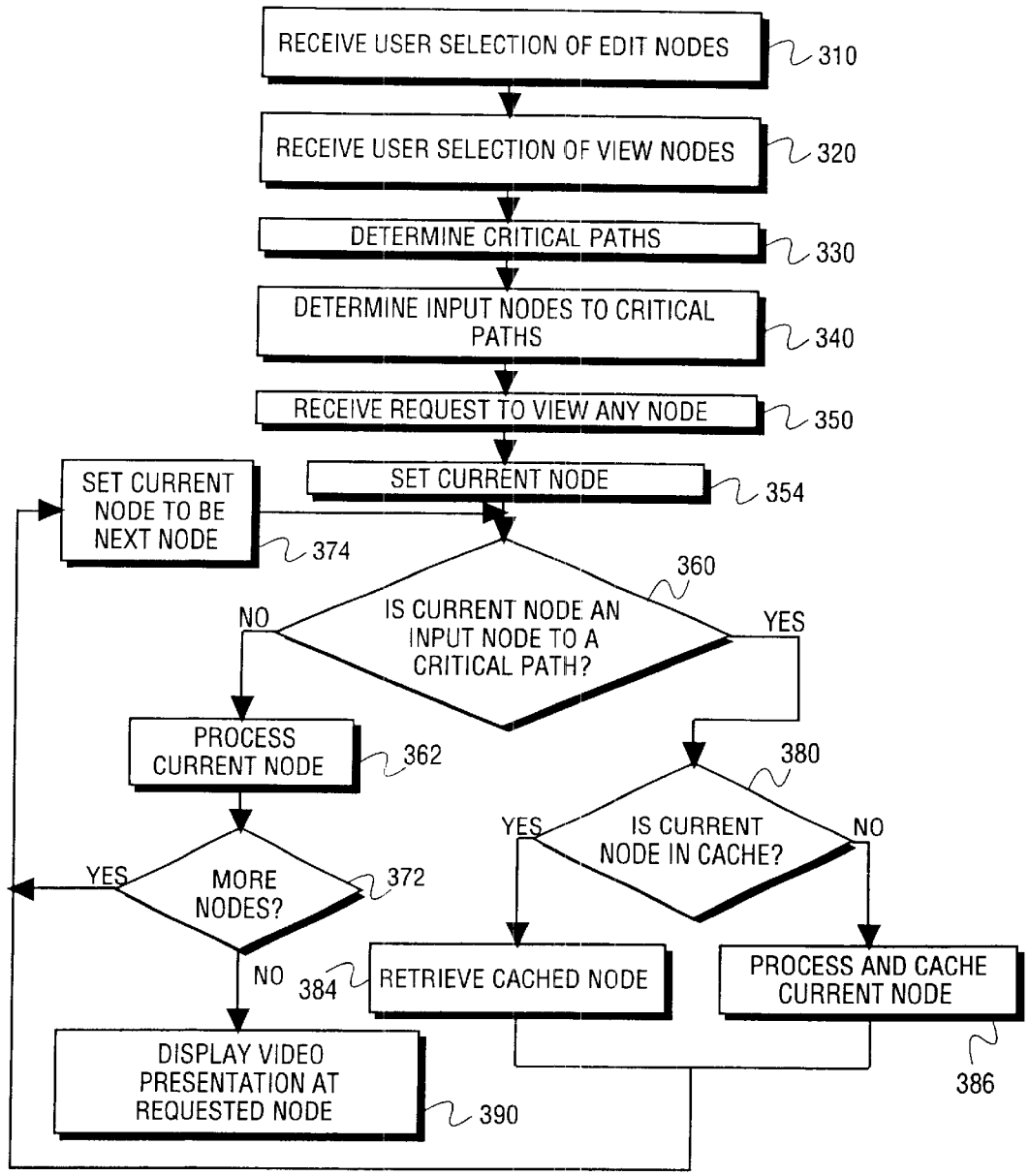
FIG. 3 depicts a flow of one embodiment of a method for increasing performance when processing images represented as directed acyclic graphs.

FIG. 3 depicts a flow of one embodiment of a method for increasing performance when processing images represented as directed acyclic graphs. The method of the present invention may be used when compositing images or sequences of images. In one embodiment, this method is implemented as software within a compositing system or effects software package. One embodiment of the method of the present invention includes providing a user the ability to specify one view node and multiple edit nodes. In this embodiment, a user may specify edit nodes and a view node after the user has created a full or partial compositing tree, and while the user is creating a compositing tree. The compositing system receives a user's selection of one or more edit nodes, as shown in block 310, and a user's selection of a view node, as shown in block 320. These selections may be made according to methods known to those skilled in the art, including, but not limited to, selecting the node with a mouse, right clicking on the mouse, and choosing "set as view node" or "set as edit node" from a pop-up menu. After a user selects a view node, the compositing system determines the critical paths for the compositing tree, as shown in block 330. As discussed above, the critical paths include all nodes between and including edit nodes at one end and the view node at the other. After the critical paths are determined, the compositing system determines the input nodes to the critical paths, as shown in block 340.

Upon receiving a request to view the current video presentation at any node, as shown in block 350, the compositing system begins processing all images and effects in the tree that are needed to view the requested node. According to one method, the tree is traversed to the leaves, and processing starts with a leaf image. Which of the leaf nodes is first loaded and which effect is first processed is not pertinent to the method of the present invention. A node that the particular processing method determines is required to process the requested node is set as the current node, as shown in block 354. A check is made to determine whether the current node is an input node to a critical path, as shown in block, 360. If the current node is not an input node to a critical path, the video presentation at the current node is processed, as shown in block 362. After the current node is processed, the method then determines whether more nodes must be processed, as shown in block 372. If no further nodes need to be processed, the current node, which must be the requested node, is displayed such that the video presentation resulting from the requested node is displayed. If there are more nodes to be processed, then the method determines what the next node is and sets the current node to be the next node, as shown in block 374. Processing then continues with the check at 360.

If the requested node is an input node to a critical path, as shown in block 360, a check is made to determine whether the current node is stored in cache memory, as shown in block 380. If the current node is in the cache, then the image presentation at the cached node is retrieved, as shown in block 384. If the current node requested is not in the cache, then the image presentation at the current node is processed and stored in cache memory, as shown in block 386. After the video presentation at the current node has been retrieved from the cache, as shown in block 384, or processed and stored in the cache, as shown in block 386, the method determines what the next node is and sets the current node to be the next node, as shown in block 374. Note that if the current node is an input node to a critical path, there must, by definition, be a next node. For this reason, no check is needed after blocks 384 and 386 to determine whether there are any further nodes to process, as there always must be more nodes.

What this method achieves is that upon an initial request to process an edit node and or a view node, the compositing system caches the video presentation produced by the input nodes to the view node that are not in the critical paths and caches the video presentation produced by the input nodes to the edit nodes that are not in the critical path. More generally, the input nodes to the critical path are cached upon initial processing of the edit and view nodes that comprise the ends of the critical paths. Then, on subsequent requests to view the video presentation at the view and edit nodes that comprise the critical path, the cached copy of the input nodes to the critical path are used rather than reprocessing the images at the input nodes to the critical paths. That is, the cached copies are maintained in memory for a period of time at least long enough to accommodate the user's editing cycle. Thus, every time an end of a critical path, be it an edit node or a view node, is to be processed, the input nodes are checked to see whether they are cached in memory. If the input nodes are cached, they are accessed from the cache; if any input nodes are not cached, the video presentations at the non-cached input nodes are processed and then cached in memory for later use. By caching the input nodes to the critical paths, reprocessing of the images at the input nodes is avoided, and the processing speed of the video presentation at the view and edit nodes at the ends of the critical paths is increased. In addition, the amount of processing required to render an image or sequence of images at a view node is reduced. This increases the performance of processing images at the view and edit nodes and thus increases the speed of use and satisfaction of the typical compositing system user who cyclically and repetitively views and edit certain specified nodes.

Applying this method is illustrative of its advantages. Referring again to the compositing tree of FIG. 2, if the user designates effect E4 as a view node and effects E5 and E8 as edit nodes, the compositing software receives these designations. The compositing software then determines the critical paths. The first critical path includes effects E4, E9, E6, and E5. The second critical path includes effects E4, E9, and E8. The input nodes to the critical paths are then determined. The input nodes to the first critical path are images BG2, FG4 and FG5, and effect E3. The input nodes to the second critical path are effects E7 and E3. The entire set of input nodes to the critical paths includes images BG2, FG4, and FG5 and effects E7 and E3. In one embodiment, the compositing system maintains a current list of the input nodes to the critical paths and updates this list whenever edit and view nodes are added, moved and deleted. In one embodiment, when a view node is deleted, the system does not flush the input nodes to the former critical path from memory, because most, if not all, of the input nodes to a new critical path will remain the same so long as the edit nodes are not reassigned.

To view the image at view node E4 the first time, E4 requires as input the images from effects E3 and E9. To process the image output at effect E3, the images at effects E3, E2, and E1 must be processed, which includes loading images BG1 and FG1, processing effect E1, loading image FG2 and processing effect E2, loading image FG3 and processing effect E3. According to the method of the present invention, the result of E3 is cached for later use because it is an input node to a node on the critical path. While performing other processing, images BG1, FG1, and FG2 and the resulting images of effects E1 and E2 are not maintained in the cache because they are not inputs to the critical path. However, depending on other features and constraints of the system, some of these images may be retained in the cache.

To process the image output at effect E9, images BG2, FG4, and FG5 are loaded into memory and effect E5 is processed. Images BG2, FG4, and FG5 are maintained in the cache as they are inputs to the critical paths. Image FG6 is loaded, effect E7 is applied, and effect E8 is then applied. The result of effect E7 is cached for later use because it is an input to the critical path. Effects E6 and E9 are then processed. The results of effects E3 and E9 are then combined via effect E4, and the resulting sequence of images is displayed.

In total, according to the method of the present invention, images BG2, FG4, FG5 and the result of effects E2 and E7 are cached for later use because they are input nodes to the critical path. Because these input nodes to the critical paths are cached, when a user subsequently edits node E5, the result of E5 can be more quickly obtained because images BG2, FG4, and FG5 are already available in the cache. When effect E8 is edited, it is applied to the result of effect E7 which is already available in the cache, alleviating the need to reload image F6 and reprocess effect E7. After editing effects E5 and E8, if the user chooses to view the result of effect E4 again, the result of effect E3 is readily available because it was cached earlier during the initial viewing of node E4. Caching the result of node E3 effectively bypasses the time and overhead that would have been required in reloading images BG1 and FG1, bypasses reprocessing E1, bypasses the reloading of FG2, bypasses the reprocessing of E2, bypasses the reloading of FG3, and bypasses the reprocessing of E3. This results in a substantial reduction of use of both memory and processor resources of the computer on which the compositing system is running. This reduction in memory usage also reduces the amount of memory management required, further freeing up the computer's resources, including the processor. The end result is that compositing system performance is increased and user effectiveness and satisfaction are increased.

The critical paths, however, must always be reprocessed as edits necessitate reapplication of the edited effect. That is, because the result of effect E9 is an input node to view node E4, and because effects E5 and E8 are edit nodes, effects E5, E6, E8 and E9 must always be processed when requesting to view the result of effect E4. However, In one embodiment, the system only processes those edit nodes that were actually altered by editing. That is, in this embodiment, if effect E5 is edited and effect E8 is not edited, the method only processes effects E5, E6 and E9 because the result of effect E8 has not changed.

Referring again to FIG. 2, in one embodiment, the input images (FG4, BG2, etc.) may be sequences of images that include frame number information. In this embodiment, the effects (E1, E2, etc.) are time-based. For example, image BG1 may be a grassy field image sequence in which frames 1–10 are quite bright because the sun is shining; frames 10–20 get slowly darker as dusk approaches; and frames 20–100 may be dark because it is night time. Continuing with this example, foreground image sequences FG1, FG2 and FG3 may be image sequences of fish that have a constant brightness throughout the length of the image sequence. If the image sequences are combined after frame 10, the resulting video presentation such as that produced resulting from effect E5 will have a background that goes dark but while foreground images remain bright. In this situation, the resulting video presentation is not realistic.

Figure 4:
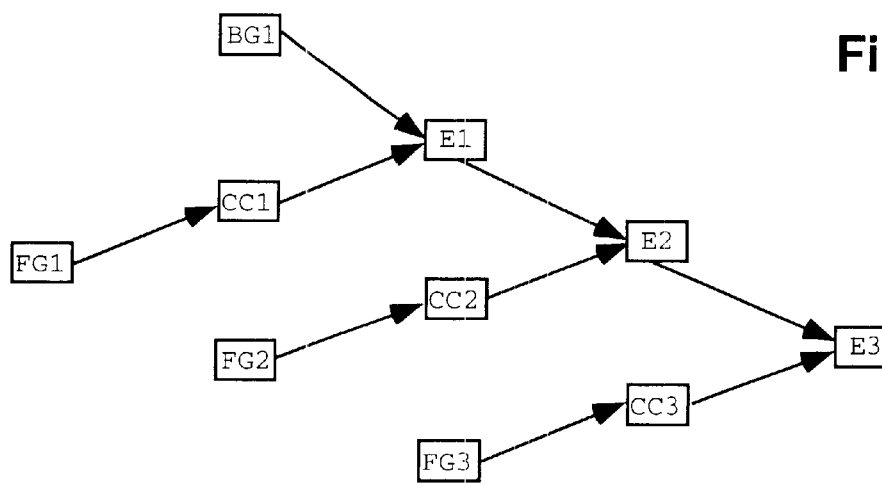
FIG. 4 depicts a portion of a compositing tree comprised of effects and images.

FIG. 4 depicts a portion of a compositing tree comprised of effects and images. To make the video presentation at E3 realistic, an effects specialist may add a color correct effect to animate the brightness of the fish. In one embodiment, the color correct effect has just one control, "brightness". In this example, to decrease the brightness, the effects specialist may set color correct effects CC1, CC2 and CC3 to gradually decrease brightness from frames 10 to 100. In one embodiment, instead of setting a brightness value at every single frame, the effects specialist may select a few "key" frames, and the compositing system interpolates the brightness for the remainder of the frames. In such a system, it is common for the effects specialist to begin a loop in which the effects specialist changes the frame number without changing the view node. For example, the effects specialist may change the frame number from frame 1 to frame 20, view the image at frame 25, and then return to frame 1. In this loop, prior art systems recompute the video presentation at each requested frame each time the effects specialist requests a video presentation at a frame number. In this example, prior art systems compute the image at frame 1, compute the image at frame 20, compute the image at frame 25, and then compute the image at frame 1 by computing the intermediate images between 1 and 20 and then recomputing most of the same images when computing the images between 1 and 25 to obtain the image at frame 25.

In the compositing system of the present invention, the caches are temporal such that when the video presentation at frame 20 is computed and displayed, the images at frames 1–20 are cached. According to the method of the present invention, this avoids recomputing frames 1–20 when the image at frame 25 is requested. That is, only the images at frames 21–25 must be computed because the intermediate images at frames 1–20 were cached when the prior processing of the image at frame 20 was requested. In this embodiment, the cache includes the image data plus the frame number for which it is valid.

By taking advantage of a user's habitual editing and viewing of particular nodes in a compositing tree, the system and method of the present invention provide a remedy to the unneeded expenditure of system resources that results in a performance degradation in traditional compositing systems.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for increasing the performance of a compositing system when compositing images represented as a directed acyclic graph, the method comprising:

identifying at least one critical path comprising one view node and at least one edit node, results of each critical path for repetitive sampling by an end user;

determining a set of input nodes to each critical path; and caching a plurality of data for only the set of input nodes for each critical path.

2. The method of claim 1 wherein the plurality of data includes at least one of a plurality of image data, a plurality of geometry data, and a plurality of audio data.

3. The method of claim 1 wherein the critical paths comprise all nodes between and including the edit nodes on one end and the view node at another end of the critical path.

4. The method of claim 1 wherein caching comprises:

when processing a node, determining whether the node is an input node to one of the critical paths;

if the node is an input node to one of the critical paths, determining whether the node is cached;

if the node is cached, retrieving the cached node;

if the node is not cached, processing the node and caching the node.

5. The method of claim 1 further comprising:

receiving a user designation of at least one view node; and receiving a user designation of at least one edit node.

6. The method of claim 1 further comprising:

receiving a request to view a video presentation at the view node;

processing the plurality of data at the view node responsive to the request; and displaying the video presentation at the view node.

7. The method of claim 6 wherein the video presentation at the view node comprises one or more images.

8. The method of claim 6 wherein displaying the video presentation comprises:

playing an accompanying soundtrack.

9. The method of claim 1, wherein the identifying comprises:

designating the one view node and the at least one edit node for the critical paths; in response to the end user alternately and repetitively viewing at least one view node and editing at least one edit node.

10. The method of claim 4 wherein the set of input nodes for each critical path are maintained in a cache memory for storage and retrieval.

11. A machine readable medium having stored thereon instructions which when executed by a processor cause the machine to perform operations comprising:

identifying at least one critical path comprising at least one view node and at least one edit node, results of each critical path for repetitive sampling by an end user;

determining a set of input nodes to the critical path; and caching a plurality of data for only the set of input nodes.

12. The machine readable medium of claim 11 wherein the plurality of data includes at least one of a plurality of image data, a plurality of geometry data, and a plurality of audio data.

13. The machine readable medium of claim 11 wherein the critical paths comprise all nodes between and including the edit nodes on one end and one view node at another end of the critical path.

14. The machine readable medium of claim 11 having stored thereon instructions which when executed by a processor cause the machine to perform operations further comprising:

receiving a user designation of at least one view node; and receiving a user designation of at least one edit node.

15. The machine readable medium of claim 11 having stored thereon instructions which when executed by a processor cause the machine to perform operations further comprising:

receiving a request to view a video presentation at the view node;

processing the plurality of data at the view node responsive to the request; and displaying the video presentation at the view node.

16. A system comprising:

a cache memory;

a processor coupled to the cache memory;

at least one view node;

at least one edit node; and a storage device coupled to the processor, the storage device having stored thereon instructions which when executed by the processor cause the processor to perform operations comprising:

identifying at least one critical path comprising at least one of the view nodes and one of the edit nodes, results of each critical path for repetitive sampling by an end user;

determining a set of input nodes to each critical path; and caching a plurality of data for only the set of input nodes for each critical path.

17. The system of claim 16 wherein the plurality of data includes at least one of a plurality of image data, a plurality of geometry data, and a plurality of audio data.

18. The system of claim 16 wherein the critical paths comprise all nodes between and including the edit nodes on one end and the view nodes at another end of the critical path.

19. The system of claim 16 wherein the instructions executed by the processor cause the processor to perform operations further comprising:

receiving a request to view a video presentation at the view node;

processing the plurality of data at the view node responsive to the request; and displaying the video presentation at the view node on a display device.

20. The system of claim 19 wherein caching comprises:

when processing a node, determining whether the node is an input node to one of the critical paths;

if the node is an input node to one of the critical paths, determining whether the node is stored in the cache memory;

if the node is stored in the cache memory, retrieving the node from the cache memory;

if the node is not stored in the cache memory, processing the node and storing the node in the cache memory.

21. An apparatus comprising:

means for identifying at least one critical path comprising at least one view node and at least one edit node, results of each critical path for repetitive sampling by an end user;

means for determining a set of input nodes to the critical path; and means for caching a plurality of data for only the set of input nodes.

22. The apparatus of claim 21 wherein the plurality of data includes at least one of a plurality of image data, a plurality of geometry data, and a plurality of audio data.

23. The apparatus of claim 21 wherein the critical paths comprise all nodes between and including the edit nodes on one end and one view node at another end of the critical path.

24. The apparatus of claim 21 wherein the means for caching further comprises:

when processing a node, means for determining whether the node is an input node to one of the critical paths;

if the node is an input node to one of the critical paths, means for determining whether the node is stored in the cache memory;

if the node is stored in the cache memory, means for retrieving the node from the cache memory; and if the node is not stored in the cache memory, means for storing the node in the cache memory.

25. The apparatus of claim 21 further comprising:

means for receiving a user designation of at least one view node; and means for receiving a user designation of at least one edit node.

26. The apparatus of claim 21 further comprising:

means for receiving a request to view a video presentation at the view node;

means for processing the plurality of data at the view node responsive to the request; and means for displaying the video presentation at the view node.

* * * * *